United States Patent
Love et al.

[19]

[11] Patent Number: 6,034,971
[45] Date of Patent: Mar. 7, 2000

[54] METHOD AND APPARATUS FOR CONTROLLING COMMUNICATION SYSTEM CAPACITY

[75] Inventors: Robert T. Love, Barrington; James P. Ashley, Naperville; Lee Proctor, Cary; Anil Barot, Elk Grove; Arnie Cohen, Buffalo Grove, all of Ill.

[73] Assignee: Motorola, Inc., Schaumburg, Ill.

[21] Appl. No.: 09/107,890

[22] Filed: Jun. 30, 1998

[51] Int. Cl.[7] .................................. H04B 7/208; H04J 3/22
[52] U.S. Cl. .......................... 370/468; 370/342; 704/220
[58] Field of Search .................................. 370/465, 468, 370/335, 342, 331; 704/220, 221; 455/522; 375/200

[56] References Cited

U.S. PATENT DOCUMENTS

| | | | |
|---|---|---|---|
| 5,414,796 | 5/1995 | Jacobs et al. | 704/221 |
| 5,442,625 | 8/1995 | Gitlin et al. | 370/342 |
| 5,745,520 | 4/1998 | Love et al. | 375/200 |
| 5,761,634 | 6/1998 | Stewart et al. | 704/220 |
| 5,771,461 | 6/1998 | Love et al. | 455/522 |
| 5,799,010 | 8/1998 | Lomp et al. | 370/335 |
| 5,884,187 | 3/1999 | Ziv et al. | 455/522 |
| 5,898,696 | 4/1999 | Proctor et al. | 370/468 |

*Primary Examiner*—Hassan Kizou
*Assistant Examiner*—John Pezzlo
*Attorney, Agent, or Firm*—Sayed Hossain Beladi

[57] ABSTRACT

Forward link communication capacity of a communication system, which is providing from a base station to a number of mobile stations a number of forward communication links corresponding to the plurality of mobile stations, is controlled by receiving gain setting associated with at least one of the forward communication links, comparing the gain setting with a gain threshold, and adjusting a first encoding rate of at least one of the forward communication links to a second encoding rate based on the comparing. A gain offset attunes the gain threshold to update the gain threshold according to a latest condition of the communication system. The gain offset further is used to determine blocking of an incoming call to the communication system.

34 Claims, 3 Drawing Sheets

METHOD AND APPARATUS FOR CONTROLLING COMMUNICATION SYSTEM CAPACITY

FIELD OF THE INVENTION

The present invention relates to communication systems and more particularly to a code division multiple access communication system.

BACKGROUND OF THE INVENTION

In communication systems, such as a code division multiple access (CDMA) communication system, a mobile station and a base station establish a two way communication link through a forward and reverse communication links. The forward communication link originates from the base station, and the reverse communication link from the mobile station. The base station normally communicates simultaneously to a number of mobile stations. Accordingly, in a CDMA communication system, the forward link signals targeted for reception by the mobile stations are combined after channel encoding, interleaving and adjusting power level of each forward link signal. An example of such a system is described in "Mobile Station-Base Station Compatibility Standard for Dual-Mode Wideband Spread Spectrum Cellular Systems" of the Telecommunications Industry Association/Electronic Industry Association Standard 95B (TIA/EIA/IS-95-B). To obtain a copy of the standard, EIA/TIA can be contacted at 2001 Pennsylvania Ave. NW Washington D.C. 20006. Through a power gain or voltage gain setting, the power level of each forward link signal in the combined signal is adjusted.

According to the protocol standard, the combined signal and each forward link signal individually may additionally be encoded for spreading the spectrum. Such encoding normally has a fixed encoding rate and is set according to the standard. The rate of the channel encoding which normally is dependent on the speech encoding rate of the channel, however, may be selected from a number of predefined encoding rates; the rate of the channel encoding hereinafter is referred to as the encoding rate. The combined forward link signal is amplified through a linear power amplifier before being transmitted from an antenna at the base station. The number of forward link signals that can be combined in the forward link communication defines the forward link communication capacity of the communication system.

The forward link communication capacity is limited by a forward link coverage limitation or a forward link interference limitation or both. The forward link coverage limitation is a geographical coverage limitation, and is a function of the maximum power level of the amplified combined signal. The maximum power level of the combined signal is set by the maximum allowable effective radiated power (ERP) mandated by the governing body for the signaling medium used (e.g. frequency spectrum) in the communication system. To reduce the limitation of the forward link communication capacity caused by the forward link coverage limitation, over a wide area serviced by a number of cells or sectors, the maximum allowable amplifying power of the linear power amplifier associated with each cell or sector is fixed to a predetermined level such that the ERP of the sector or cell is not violated, and as such, a geographical coverage area is adequately provided. Furthermore, to maintain an overall balanced coverage of the communication system, the maximum allowable transmit power level of all cells or sectors are adjusted coherently.

The forward link interference limitation, however, can not be remedied simply by adjusting the amplifying capacity of the linear power amplifier because the forward link interference limitation is due to interference caused by other forward link signals transmitted from adjacent or nearby sectors and cells of the communication system. The multipath effects of the forward link signals transmitted from the sector serving the mobile station and other sectors and cells are some other sources of interference. The forward link interference limitation forces the forward link signals to be transmitted at higher power levels for the mobile stations in certain "hot" areas within the coverage area that are effected by the interference limitation. Normally, there are higher concentrations of mobile users in the hot areas than the surrounding areas. As a result, the interference effects of the forward link signals in the hot areas are more pronounced than the surrounding areas. To increase the power level of a forward link signal, voltage gain or power gain of the forward link signal is adjusted to a higher than normal level.

When the forward link signals targeted for the hot areas require higher gain, the linear power amplifier would have less remaining linear amplifying power capacity. As a result, the total number of forward link signals that can be combined in the forward link communication is reduced. The combined effect of the gains of the forward link signals that are combined for amplifying through the linear power amplifier establishes the loading level of the power amplifier. The loading of the linear power amplifier should not exceed the maximum allowable amplifying power. Moreover, the amplified signal should not exceed the mandated maximum ERP level set by the appropriate governing body for that signaling medium. The loading level should be kept at a level that results in proper linear amplification of the combined signal. Since the number of forward link signals that are combined defines the forward link communication capacity, the forward link interference limitation, thus, reduces the communication system forward link communication capacity.

Furthermore, when the combined signal has reached its maximum power level, to maintain linearity of the power amplifier operation, any increase in gain of any forward link may force other forward link signals to be involuntary dropped due to the resulting poor frame error rate. When the calls are dropped involuntary, the communication system reliability and efficiency are highly undermined.

Any adjustment of the maximum allowable amplifying power of the linear power amplifier at each sector or cell can not overcome the forward link interference limitation in the hot coverage areas because such adjustment effects a wide coverage area; such adjustment may also create new hot coverage areas. Moreover, any adjustments of the maximum allowable amplifying power of the linear power amplifiers of less than all sectors or cells would upset the balanced coverage.

Therefore, there is a need for controlling the forward link communication capacity in response to the forward link interference limitation to maximize the forward link communication capacity, and prevent involuntary dropping of the calls.

DETAILED DESCRIPTION OF THE PREFERRED EMBODIMENT(S)

Figure 1:
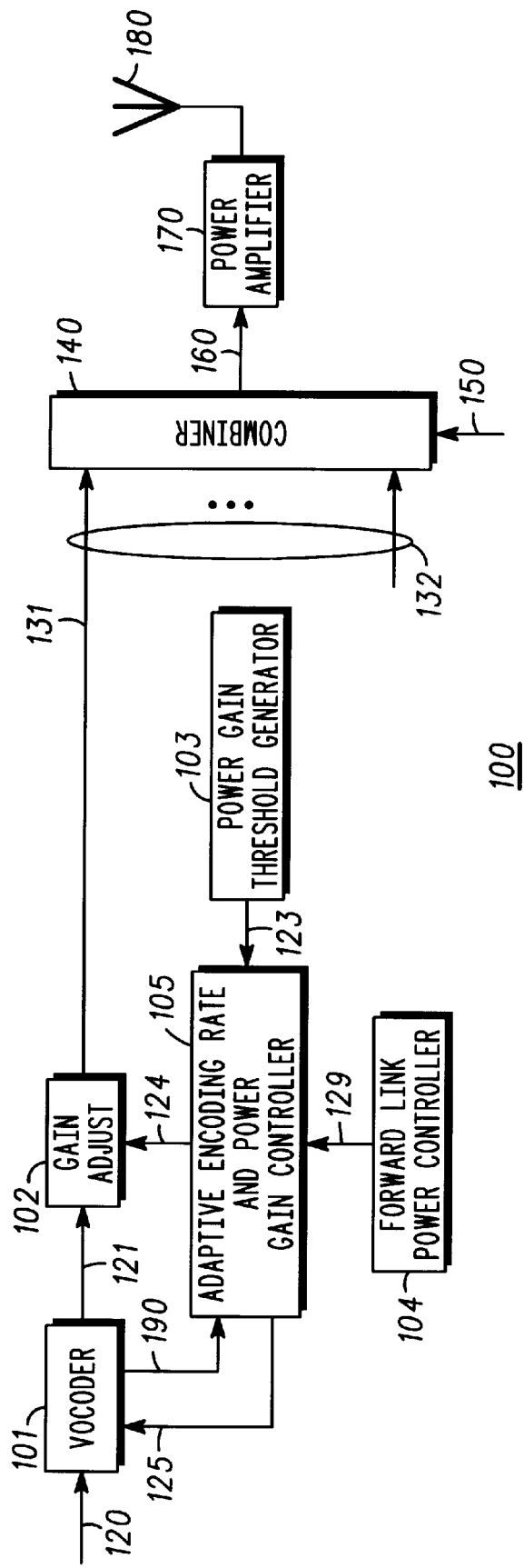
FIG. 1 depicts a block diagram of various embodiments of the invention.

In a communication system providing from a base station to a plurality of mobile stations a plurality of forward communication links corresponding to the plurality of mobile stations, a method for controlling the communication system forward link communication capacity includes receiving a gain information associated with at least one of the plurality of forward communication links, comparing the gain information with a gain threshold, and, based on the result of the comparing, adjusting an encoding rate of at least one of the plurality of forward communication links. Adjusting the encoding rate effectively allows controlling the forward link communication capacity of the communication system; and as a result, the forward link communication capacity can be maximized.

Controlling the forward link communication capacity by adjusting one or more encoding rates to maximize the forward link communication capacity is illustrated by making references to the following diagrams and mathematical relationships. To begin, frame error rate (FER) of a signal received at a receiver is a function of energy per bit (Eb) divided over total noise and interference power spectral density (No) of the signal. For a forward link signal in a CDMA communication system operating according to the Cellular System Remote unit-Base Station Compatibility Standard of the Electronic Industry Association/Telecommunications Industry Association Interim Standard 95 (TIA/EIA/IS-95-B), the Eb/No for various frame error rates including 1% frame error rate (FER) are given for various channel conditions and mobile location geometries in "Recommended Minimum Performance Standards for Dual-Mode Wideband Spread Spectrum Cellular Mobile Stations" of the Electronic Industry Association/Telecommunications Industry Association Interim Standard 98A (TIA/EIA/IS98-A). The Eb/No of a signal transmitted from a serving base station and received at the mobile station to attain 1% FER ranges from 0 to 26 dB given all the possible channel conditions and mobile speeds. Normally, a frame error rate of 1% produces an acceptable audio quality at the mobile station.

The Eb/No in relation to chip energy (Ec) of the forward link signal transmitted from the serving sector or cell, power spectral density of the signals transmitted from other cells and sectors that are causing interference and measured at the mobile station (Ioc), total power spectral density of the combined forward link signal transmitted from the serving sector measured at the antenna connector of the serving sector (Ior) and measured at the mobile station receiving antenna ($\hat{I}_{or}$), CDMA spreading bandwidth (W) of the forward link determines the chip rate (Rc), and the encoding rate (R) of the channel information carried by the forward link is defined as:

$$E_b/N_o = (E_c/I_{or}) \cdot (\hat{I}_{or}/I_{oc}) \cdot (W/R) \quad \text{(equation 1)}$$

The following relationship shows voltage gain and power level of forward links, and other signals that are combined in the combined forward link signal in relation to Ec and Ior.

$$E_c/I_{or} = \left(\frac{G_{fli}^2}{G_{total}^2}\right) = \left(\frac{G_{fli}^2}{G_{pilot}^2 + G_{page}^2 + G_{sync}^2 + \sum_{k=1}^{n} G_{flk}^2 \rho_k}\right) \quad \text{(equation 2)}$$

$$P_{fli} = \left(\frac{G_{fli}^2}{G_{total}^2}\right) P_{total} = E_c R_c = E_c W \quad P_{total} = I_{or} W \quad \text{(equation 3)}$$

In the above equations, $G_x$ are the voltage gains, $G_x^2$ are the power gains, and $P_x$ are the power levels for the forward link identified by the subscript (x), such as "fli" for the "ith" forward link in the forward links from "1 to n" where "n" is a finite number. The term $r_k$ represents the encoding rate scale factor for a given frame interval and is normally proportional to the square root of the ratio of the current encoding rate to the maximum encoding rate. The gains for the overhead channels, such as pilot, page, and synchronization (sync) channels, the overall gain applied to the power amplifier (Gtotal), and the resulting total power (Ptotal) are also identified. These relations normally hold true as long as the amplifying operation occurs in the linear region of the power amplifier amplifying the combined signal.

When the gain setting ($G_{fl}$) of the forward link signal is increased, the Eb/No ratio of the signal received at the receiver also increases, as a result, the frame error rate of the signal is improved. Normally, the mobile station monitors the frame error rate of the received forward link signal, and when poor frame error rate is detected, the mobile station through the CDMA system protocols requests from the base station for an increase in the gain setting of the forward link signal. When forward link signals are targeted for reception by mobile stations in the hot coverage area, each mobile station requests a higher than normal gain ($G_{fl}$) setting for its associated forward link signal to overcome the effects of the interference (Ioc) as being experienced in the hot area. Basically, the mobile station tries to maintain an adequate frame error rate by requesting a higher gain setting ($G_{fl}$) when Eb/No of the signal being received is degraded by an increase in the level of the interference signals (Ioc) or a change has occurred in the path loss between the base station and mobile station which is represented by the difference between Ior and $\hat{I}or$ in decibels.

If some portion of the coverage region is already interference limited, increasing the gain setting to overcome the effect of the interfering signals will not be effective since other sectors or cells will also increase their power levels in a proportional amount in response to the additional interference caused by the increase in the gain setting. An increase in the gain setting of a forward link signal also increases the forward link interference in the system by requiring other forward link signal to be transmitted at higher power level which escalate the reduction in the remaining linear amplifying capacity of the linear power amplifier. As a result, no net increase in Eb/No ratio may be achieved by increasing the gain setting.

According to various embodiments of the invention, by adjusting the forward link encoding rate (R), the Eb/No of the forward link signal received at the mobile station is maintained at a level to provide an adequate frame error rate at the receiving mobile station. At the same time, the gain setting ($G_{fl}$) that was decided to be adequate to overcome the interference is scaled by a factor (r) that is proportional to the square root of the ratio of the new and the previous encoding rates. Normally, the maximum encoding rate is used as the reference instead of the previous encoding rate. Since the Eb/No is proportional to the signal power $P_{fl}$, and Eb/No is inversely proportion to the encoding rate (R) as shown in the above equations, transmitting at a lower encoder rate allows a drop in the gain setting of the forward link. As a result, less interference is created and a larger portion of the linear amplifying capacity of the power amplifier is preserved. As such, more forward link signals can be combined for amplification and subsequent transmission without violating the ERP level. The forward link communication capacity, thus, is maximized.

When a mobile station detects poor frame error rate, it requests a higher gain setting for its associated forward link signal. According to the invention, the gain setting is periodically or continuously compared with a gain threshold to determine whether any change in the encoding rate (R) should occur. A periodic comparison may take place every 20 mSec, which is also the period of each CDMA frame according to the standards. The gain threshold is selected based on various embodiments of the communication system performance and conditions such that the combined signal would not unnecessarily load the power amplifier. If the gain information satisfies the gain threshold, the degradation of frame error rate is responded to by adjusting the encoding rate. Moreover, the power level of the forward link signal is adjusted in proportion to a ratio of the new and the previous encoding rates.

According to various embodiments of the invention, the encoding rate is reduced when the gain information is higher than the power gain threshold. The encoding rate, however, may be selected from a plurality of predefined encoding rates. In case of the CDMA communication system, at least four encoding rates may be possible in addition to other encoding rates. Namely, the encoding rates are full, one half, one quarter, and one eight rates. For example, if the power gain information is higher than the gain threshold and the encoding rate is at the full rate, the encoding rate is reduced to the one half rate. The voice quality of the one half rate is lower than the quality which the full rate encoding can produce, however, the reduction in quality is acceptable for some vocoders (e.g. half rate mode of the 13 kbps QCELP vocoder as described in CDG-27, and PN3972 High Rate Speech Service Option for Wideband Spread Spectrum Communication System, available from TIA.) and in many high interference cases the reduction in quality is unnoticeable. Moreover, the encoding rate may be adjusted to an encoding rate other than the predefined encoding rates. As a further advantage of the invention, the frequency of a frame erasure of the forward link due to its poor frame error rate is reduced. As such, the reliability of a the communication call is improved.

In the most preferred embodiment of the invention, the forward communication link that has its encoding rate adjusted is the same forward communication link that has its gain information compared with the gain threshold. The plurality of forward communication links may be over a carrier frequency, and the communication system may be a code division multiple access communication system.

Referring to FIG. 1, a block diagram 100 shows various embodiments of the invention. A vocoder 101, which normally include an encoder portion, receives a forward communication link channel information 120, such as voice data. Vocoder 101 encodes channel information 120 according to an encoding rate adaptor 125 to produce encoded signal 121. A gain adjust 102 according to a gain adjuster 124 adjusts the power level or voltage level of signal 121 to produce forward link signal 131. In theory and practice, the term "gain" may be used interchangeably for indicating power gain or voltage gain. Encoding rate adaptor 125 and gain adjuster 124 are produced, according to various embodiments of the invention, by an adaptive encoding rate and gain adjust controller (AERGAC) 105. A gain threshold 123, an encoding rate selector 190 and a forward link gain information 129 are inputs to AERGAC 105. The gain information 129 and gain threshold 123 may be related to voltage or power level of the signal. Accordingly, AERGAC 105 compares gain information 129 to gain threshold 123 to produce encoding rate adaptor 125. The encoding rate adaptor 125 is coupled to vocoder 101 to be used for deciding the encoding rate. Such a use may include adjusting a threshold or a set of thresholds in vocoder 101 for determining the encoding rate. If encoding rate adaptor 125 indicates a need for an adjustment of the encoding rate, vocoder 101 encodes channel information 120 according to a new encoding rate to produce signal 121 or increases the likelihood of adjusting the encoding rate. If encoding rate adaptor 125 indicates a need for reducing the encoding rate, vocoder 101 reduces the encoding rate, conversely, for increasing the encoding rate. The new encoding rate is communicated to AERGAC 105 by encoding rate selector 190. AERGAC 105 scales gain information 129 to produce gain selector 124 level according to a ratio of the new and previous encoding rates.

Forward link signal 131 is combined with other forward link signals, collectively shown as forward link signals 132, in a combiner 140. Normally, in a CDMA communication system, each forward link signal in forward link signals 132 has been encoded and its voltage or power gain is adjusted similar to what is described and shown for forward link signal 131. Other signals, such as the page, pilot or synchronization signals, are also combined with forward link signals 132 to produce a combined signal 160. The page, pilot or synchronization signals are transmitted according to the communication system protocols and are needed for proper operation of the communication system. Each cell or sector of a communication system may have a set of associated page, pilot or synchronization signals. Combined signal 160 is amplified in a linear power amplifier 170 before being transmitted from antenna 180.

A forward link power controller 104 as shown in FIG. 1 outputs gain information 129 associated with channel information 120. Power controller 104 determines gain information 129 based on the information obtained about various system performances including a request by a mobile station which is intended to receive the forward link signal 131. According to the invention, controller 104 inputs AERGAC 105 gain information 129 for determining power gain adjuster 124, and encoding rate adaptor 125.

Figure 2:
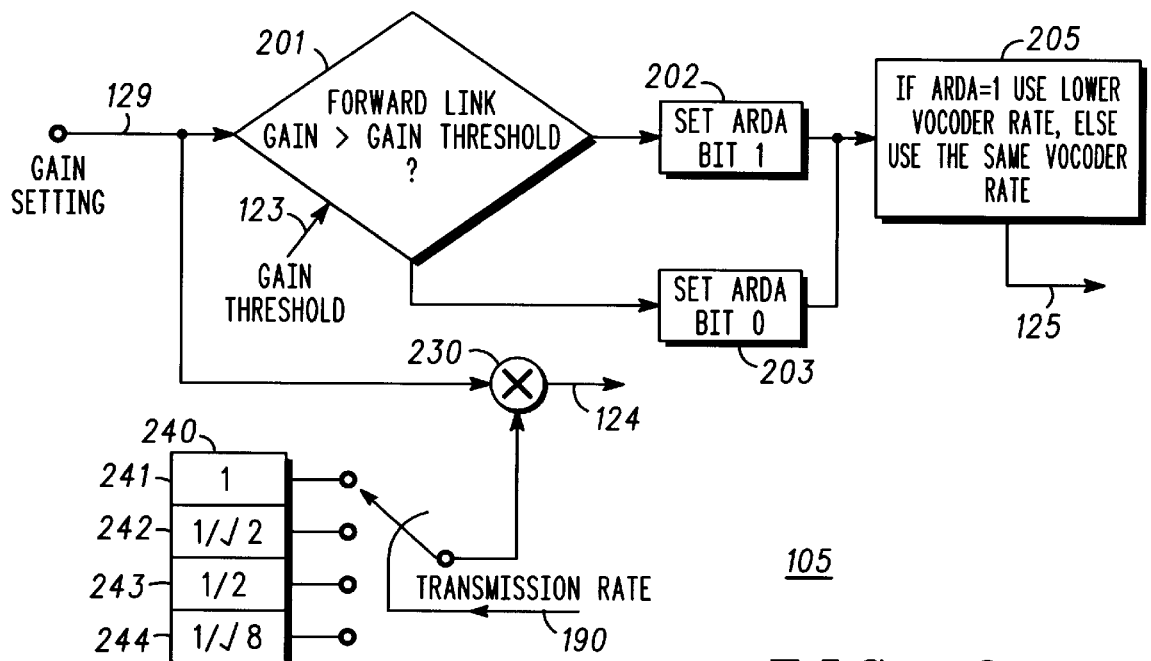
FIG. 2 depicts a block diagram of an adaptive encoding rate and gain adjust controller according to various embodiments of the invention.

Referring to FIG. 2, a block diagram of AERGAC 105 according to various embodiments of the invention is shown. Gain information 129 is generated by forward link power controller 104, and it indicates the gain setting of encoded signal 121. The gain setting is determined to be necessary for reception of forward link signal 131 at its intended mobile station with adequate frame error rate. Gain information 129 is compared with gain threshold 123 at a decision block 201. If gain information 129 is larger than gain threshold 123, an adaptive rate determination algorithm (ARDA) data bit is set to a logical high (1). If the condition at decision block 201 is not satisfied, i.e. gain information 129 is smaller than gain threshold 123, ARDA data bit is set to a logical low (0). A block 205 receives the status of ARDA data bit from blocks 202 and 203, and outputs encoding rate adaptor 125. Based on the status indicated by encoding rate adaptor 125, vocoder 101 selects an encoding rate and outputs such information by encoding rate selector 190. When ARDA is set to "1", encoding rate adaptor 125 indicates for selecting a lower encoding rate in the vocoder 101 other than what it would have selected. The selection of the encoding rate in vocoder 101 is not effected by ARDA data bit when ARDA is set to "0".

Gain information 129 is scaled in a scaler 230 according to a scaling factor in scaling factor 240. The factor is selected according to the encoding rate selected by encoding rate selector 190. Gain information 129 is scaled in scaler 230 to produce gain adjuster 124 when a lower encoding rate has been selected by encoding rate selector 190. If encoding rate selector 190 is changing the encoding rate from the full rate to the one half encoding rate, the scaling factor used in scaler 230 is equal to one over the square root of two as shown at 242. In case of no change in the encoding rate from full rate, the scaling factor in scaler 230 is equal to one as shown in scaling factor block 240 at 241. Such implementation allows the invention to be incorporated into an existing communication system forward link power control scheme without requiring extensive re-engineering of the existing system.

Gain threshold 123 may be determined by several analytical methods. One such method is a statistical analysis of a plurality of gain settings associated with the plurality of forward communication links in forward link signals 132. The plurality of gain settings in combination based on the statistical analysis is calculated to lead to a loading level less than a full loading level of linear power amplifier 170 or the forward link communication capacity. The loading level is less than ninety percent of the full loading level in a preferred embodiment of the invention. Moreover, the communication system may have several gain thresholds for various channel conditions and mobile location geometries as may be recommended by the industry association. For example, when a mobile station is located between two cells or sectors in a two way hand-off, the gain threshold may be adjusted by a predetermined value to account for variation of the channel conditions and mobile location geometries associated with a two way hand-off. Similarly, the gain threshold may be adjusted by a predetermined value for a three way hand-off situation. Note that hand-off denotes the condition where a mobile station is communicating simultaneously with two or more sectors.

Figure 3:
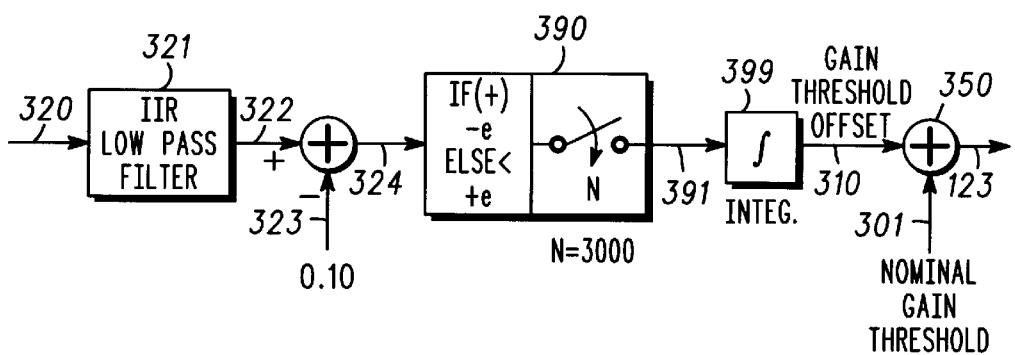
FIG. 3 depicts a block diagram of a gain threshold offset generator according to various embodiments of the invention.

Referring to FIG. 3, to account for the communication system variations over time and operating condition according to the invention, a gain threshold offset 310 updates gain threshold 123. A fixed and nominal gain threshold 301 is initially selected which may be based on the statistical analysis of the communication system estimated loading. Gain offset 310 either continuously or periodically attunes the nominal gain threshold 301 to produce gain threshold 123. The gain offset 310 is also regulated by taking data points and accumulating them over time before its value is updated.

To determine gain threshold offset 310, a number of forward communication links having a frame error rate greater than a predetermined level is ratiocinated over a number of the plurality of forward communication links to produce a ratio 320. In the preferred embodiment, the predetermined frame error rate is nominally equal to three and half percent frame error rate. Furthermore, ratio 320 is filtered by a filter 321 having a finite low pass frequency response. This filtering process allows filtering instantaneous changes in the number of the forward communication links having a frame error rate less than the predetermined level. As a result, the instantaneous changes in ratio 320 are filtered to produce a smooth control of the forward link communication capacity. An output 322 of filter 321 may be adjusted by a predetermined value 323 to produce an error offset value 324. For example, the predetermined value 323 is selected to account for various channel conditions and location geometries. The error offset 324 is sampled in a block 390 over a finite number of clock cycles, and a sampled result 391 is integrated in an integrator 350 to produce gain threshold offset 310. For example, if error offset 324 is less than 0.05, sampled result 391 is integrated up, conversely, if error offset 324 is more than 0.10, sampled result 391 is integrated down to produce gain threshold offset 310. Gain threshold offset 310 attunes nominal gain threshold 301 in a tuner 350 to produce gain threshold 123. Based on the sampling frequency and other data collection for determining ratio 320 over time, gain threshold offset 310 attunes nominal gain threshold 301 approximately once every one to three minutes in a typical CDMA system. As such, gain threshold 123 is updated at least once every one to three minutes to account for any changes in the communication system condition.

Most communication systems provide the communication coverage through a network of cells, where each cell may have a plurality of sectors. Each sector may have many independent interworking components and a unique operating frequency band. For example, each sector may be assigned to operate on a unique frequency channel for all forward communication links originated from that sector. In order to take the most benefit from the invention, the invention should be incorporated in every sectors of a cell. As such, each sector independently determines a gain threshold offset 310 based on ratio 320 of the forward communication links originated from that sector.

Figure 4:
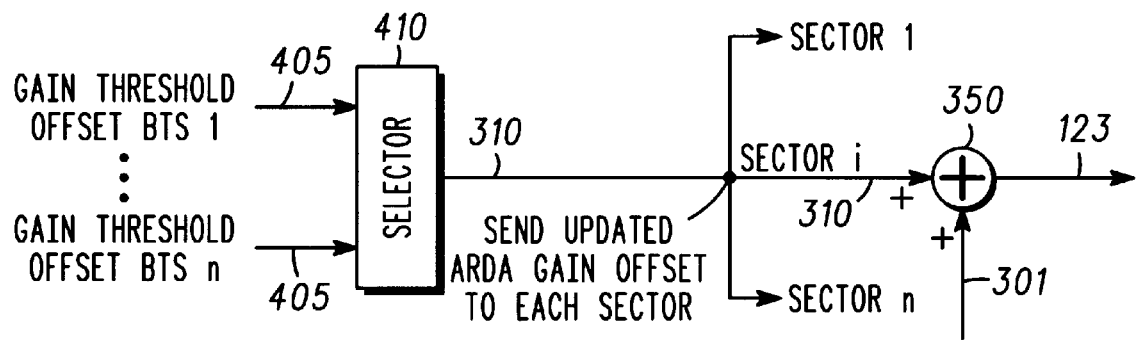
FIG. 4 depicts a block diagram of selecting a gain threshold offset from a plurality of gain threshold offset according to various embodiments of the invention.

Referring to FIG. 4, in a case where the communication system is providing the forward communication links from a plurality of communication sectors, gain threshold offset 310 is selected at a selector 410 from a plurality of gain threshold offsets 405 corresponding to the plurality of sectors. The selection in selector 410 may be based on a variety of factors including the maximum and minimum gain threshold offsets in plurality of gain threshold offsets 405. The selected gain threshold offset is communicated to all sectors. As such, every sector would have the same gain threshold offset 310.

Each gain threshold offset in plurality of power gain threshold offsets 405 is determined based forward communication links that are commonly associated with one of the plurality of communication sectors. In alternative or combination, the number of forward communication links having a frame error rate greater than a predetermined value and the number of forward communication links selected for calculating the ratio are having a common encoding rate. Furthermore, in alternative or combination, the number of forward communication links having a frame error rate greater than a predetermined value and the number of forward communication links selected for calculating the ratio are having a common carrier frequency.

To prevent unacceptable degradation of a forward link voice quality, it may be necessary to prevent adjustment to the encoding rate even though the condition for adjusting the encoding rate has been satisfied. Therefore, when a forward link has an encoding rate at or below a predetermined encoding rate, further adjustment to the encoding rate of the forward communication link is prevented. For example, the encoding rate of a forward link which has an encoding rate at one quarter of rate is not reduced to one eight rate even though condition for reducing the encoding rate has been satisfied. Also the unacceptable degradation of forward link voice quality is prevented by limiting the minimum level of gain threshold offset 310 which directly determines the duration at which the adjusted encoding rate will persist. When gain threshold offset 310 has reached this minimum level it is necessary to perform some other load extension or shedding function. Blocking new incoming calls is an example of a load shedding. Normally, new incoming calls refers to new call originations and terminations but could also include new links established to support hand-offs.

Figure 5:
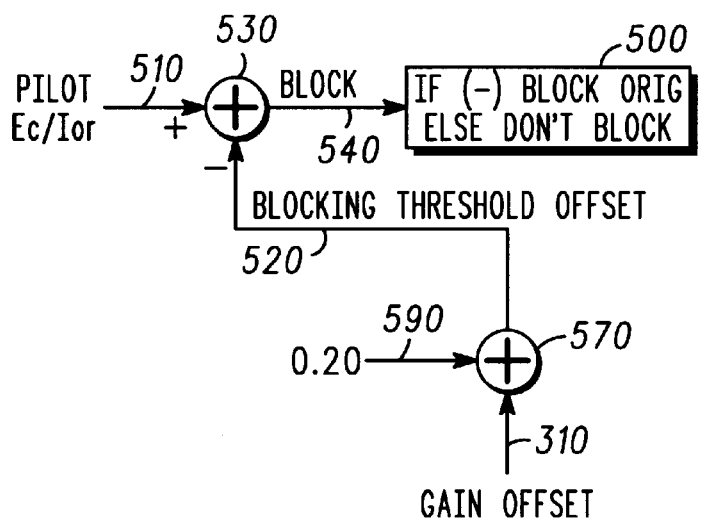
FIG. 5 a block diagram of various embodiments of the invention for blocking an incoming call based on a gain threshold offset.

Referring to FIG. 5, gain threshold offset 310 or one calculated based on substantially similar method as described for calculating gain threshold offset 310 can be used to compute a blocking threshold offset 520. Blocking threshold offset 520 may be used to determine whether to block establishment of new incoming calls. A block diagram for blocking incoming calls based on blocking threshold 520 is shown in FIG. 5. The Ec divided over Ior of the pilot signal is calculated or measured at each sector. Note that equation 2 represents a way computing pilot Ec/Ior where Gfli is replaced by Gpilot in the numerator. A ratio of Ec/Ior (pilot) 510 is summed in summer 530 with blocking threshold offset 520 to produce a blocking indicator 540. Blocking indicator 540 is evaluated in a block 560 to determine whether any incoming call should be blocked.

Normally, ratio 510 is an indicator of the system loading level, and may be relied upon for determining whether to block any incoming call. When the system loading level is high, the possibility of blocking an incoming call is high. The ratio 510, however, when summed with blocking threshold offset 520, which may have been predetermined, may not produce an accurate blocking indicator 540 under certain conditions. As a result, when gain offset 310 (which is normally limited to the range (–0.1, 0.1)) is incorporated in deciding whether to block any incoming call, a more efficient method of blocking calls would result, because gain offset 310 has updated information about the system loading level and other conditions. Gain offset 310 is summed in a summer 570 with a blocking error 590 to produce a more accurate blocking threshold offset 520. Blocking error 590 has a value which may have been determined empirically or based on field data or a combination of both. As a result, the blocking function is performed more accurately based on updated system information.

Block 560 based on block indicator 540 decides whether to block an incoming call. If block indicator 540 is less than a first predetermined threshold, block 560 would block all incoming calls. The blocking may be limited only to a sector that is attempting to serve the incoming call. If block indicator 540 is less than a second predetermined threshold, block 560 would block all incoming calls to a sector that is attempting to serve the incoming call and the sectors that have been determined to be the most likely sectors for taking new incoming calls whether by way of hand-offs or otherwise. The sectors other than the serving sector are the sectors identified in the neighbor list of the serving sector. The sectors other than the serving sector may be selected from the neighbor list. Such selection may be limited to a number of sectors that have higher priority in the neighbor list. Each sector is required to have a neighbor list as described in the standard protocols. The list and the priority of the sectors in the list may be created by a known method or a propriety method which normally includes measurement of Ec/Io of pilot signals transmitted from the surrounding sectors. One or more methods of creating the neighbor list and the priority of the sectors in the list have been described in the recently published specification, IS-95B. The blocking of an incoming call may be in a form of denying service or redirecting the incoming call to another communication system or carrier frequency in the receiving communication system.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What is claimed is:

1. In a communication system providing from a base station to a plurality of mobile stations a plurality of forward communication links corresponding to said plurality of mobile stations, a method for controlling forward link communication capacity of said communication system comprising the steps of:

receiving gain setting associated with at least one of said plurality of forward communication links;

determining a gain threshold offset including the step of calculating a ratio of a number of said forward communication links having a frame error rate greater than a predetermined level over a number of said plurality of forward communication links;

attuning a gain threshold by said gain threshold offset;

comparing said gain setting with said gain threshold; and adjusting a first encoding rate of at least one of said plurality of forward communication links to a second encoding rate based on said comparing step, thereby controlling forward link communication capacity of said communication system.

2. The method as recited in claim 1 further includes the step of preventing said adjusting step when said first encoding rate is below a predetermined encoding rate.

3. The method as recited in claim 1 wherein said adjusting step includes selecting said second encoding rate from a plurality of predefined encoding rates.

4. The method as recited in claim 1 wherein said second encoding rate is lower than said first encoding rate when in said comparing step said gain setting is higher than said gain threshold.

5. The method as recited in claim 1 further comprising the step of scaling said gain setting by a factor proportional to a ratio of said second and first encoding rates.

6. The method as recited in claim 1 further comprising the step of scaling said gain setting by a factor proportional to a ratio of said second rate and a maximum encoding rate possible in said communication system.

7. The method as recited in claim 1 wherein said least one of said plurality of forward communication links in said adjusting step is associated with said gain setting received in said receiving step.

8. The method as recited in claim 1 wherein said communication system is a code division multiple access communication system.

9. The method as recited in claim 1 wherein said gain threshold is selected from a plurality of gain thresholds associated with a corresponding plurality of predefined conditions in said communication system.

10. The method as recited in claim 9 wherein said plurality of predefined conditions includes from two to six ways hand-off conditions.

11. The method as recited in claim 1 wherein said gain threshold is based on a statistical analysis of a plurality of gain settings associated with an estimated plurality of forward communication links that leads to a loading level less than a full loading level of said communication forward link communication capacity.

12. The method as recited in claim 11 wherein said loading level is less than ninety percent of said full loading level.

13. The method as recited in claim 1 wherein said number of said forward communication links having a frame error rate greater than a predetermined level is substituted for a number of said forward communication links having a gain setting greater than a predetermined gain setting level.

14. The method as recited in claim 13 wherein said predetermined gain setting level is less than a maximum gain setting possible in said communication system.

15. The method as recited in claim 1 wherein said predetermined level is substantially equal to a three and half percent frame error rate.

16. The method as recited in claim 1 wherein said determining step further includes the step of filtering a result of said calculating said ratio by a filter having a finite low pass frequency response.

17. The method as recited in claim 16 wherein said determining step further includes the step of adjusting a result of said filtering step by a predetermined value to produce an error offset.

18. The method as recited in claim 17 wherein said determining step further includes the step of sampling said error offset, and integrating a result of said sampling to produce said gain threshold offset.

19. The method as recited in claim 1, wherein said communication system provides said plurality of forward communication links from a plurality of communication sectors, further includes the step of selecting said gain threshold offset from a plurality of gain threshold offsets corresponding to said plurality of sectors.

20. The method as recited in claim 19 wherein said selected gain threshold offset is commonly used among said plurality of communication sectors.

21. The method as recited in claim 1, wherein said communication system provides said plurality of forward communication links from a plurality of communication sectors, said number of forward communication links having said frame error rate greater than said predetermined level and said number of said plurality of forward communication links are commonly associated with one of said plurality of communication sectors.

22. The method as recited in claim 1 wherein said number of forward communication links having said frame error rate greater than said predetermined level are having a common encoding rate.

23. The method as recited in claim 1 wherein said number of forward communication links having said frame error rate greater than said predetermined value and said number of forward communication links are having a common carrier frequency.

24. The method as recited in claim 1 further including:
   determining a ratio of chip energy of a pilot signal in said communication system over a combined forward link signal transmit power level spectral density from a sector in said communication system; and
   summing said ratio with a blocking threshold offset to produce a blocking indicator which depending on said blocking indicator status a new incoming call to said communication system is blocked, wherein said blocking threshold offset is at least a function of said gain threshold offset.

25. The method as recited in claim 24 wherein said determining a ratio of chip energy of a pilot signal in said communication system over a combined forward link signal transmit power level spectral density from a sector in said communication system is substituted by determining a ratio of pilot signal power over a combined forward link signal transmit power.

26. The method as recited in claim 24 wherein said blocking threshold offset is produced by at least summing said gain threshold offset with a blocking error.

27. In a communication system providing from a base station to a plurality of mobile stations a plurality of forward communication links corresponding to said plurality of mobile stations, a method for blocking establishment of incoming calls comprising the steps of:
   determining a ratio of chip energy of a pilot signal in said communication system over a combined forward link signal transmit power spectral density level from a sector in said communication system; and
   summing said ratio with a blocking threshold offset to produce a blocking indicator which depending on said blocking indicator status a new incoming call to said communication system is blocked, wherein said blocking threshold offset is at least a function of a gain threshold offset.

28. The method as recited in claim 27 wherein said determining a ratio of chip energy of a pilot signal in said communication system over a combined forward link signal transmit power level spectral density from a sector in said communication system is substituted by determining a ratio of pilot signal power over a combined forward link signal transmit power.

29. The method as recited in claim 27 wherein said blocking threshold offset is produced by at least summing said gain threshold offset with a blocking error.

30. In a communication system providing from a base station to a plurality of mobile stations a plurality of forward communication links corresponding to said plurality of mobile stations, an apparatus for controlling said communication system forward link communication capacity comprising:
   means for receiving gain settings associated with at least one of said plurality of forward communication links;
   means for comparing said gain setting with a gain threshold, and outputting a data bit with a status indicating said gain setting is one of a higher and lower than said gain threshold;
   means for generating a gain threshold offset;
   means for determining said gain threshold offset including means for calculating a ratio of a number of said forward communication links having a frame error rate greater than a predetermined level over a number of said plurality of forward communication links;
   means for attuning said gain threshold by said gain threshold offset:
   means for adjusting encoding rate of at least one of said plurality of forward communication links based on the status of said data bit from a first to a second encoding rates, thereby controlling said communication forward link communication capacity.

31. The apparatus as recited in claim 30 wherein said means for adjusting encoding rate is in a vocoder in said communication system.

32. The apparatus as recited in claim 30 wherein said means for adjusting encoding rate includes means for selecting said second encoding rate from a plurality of encoding rates.

33. The apparatus as recited in claim 30 further comprising means for scaling said gain setting by a ratio proportional to said second and first encoding rates.

34. The apparatus as recited in claim 30 further comprising means for blocking an incoming call based on said gain threshold offset.

* * * * *